United States Patent [19]

Takano

[11] 4,240,697
[45] Dec. 23, 1980

[54] LENS SYSTEM HAVING SELECTIVELY SHIFTABLE FOCAL LENGTH

[75] Inventor: Eiichi Takano, Tokyo, Japan

[73] Assignee: Canon Kabushiki Kaisha, Tokyo, Japan

[21] Appl. No.: 692,518

[22] Filed: Jun. 3, 1976

[30] Foreign Application Priority Data

Jun. 5, 1975 [JP] Japan .................................. 50-67955
Jun. 6, 1975 [JP] Japan .................................. 50-68763

[51] Int. Cl.³ .................... G02B 15/04; G02B 15/18
[52] U.S. Cl. .................................... 350/183; 350/184
[58] Field of Search ............................... 350/183, 184

[56] References Cited

U.S. PATENT DOCUMENTS

| | | | |
|---|---|---|---|
| 3,512,872 | 5/1970 | Lynch et al. | 350/183 |
| 3,751,136 | 8/1973 | Kirchhoff | 350/184 |
| 4,015,895 | 4/1977 | Hirose | 350/183 |

Primary Examiner—Conrad J. Clark

Attorney, Agent, or Firm—Toren, McGeady and Stanger

[57] ABSTRACT

A zoom lens system is constructed of a focusing member, variator, compensator and an image-forming lens arranged on a common optical axis in this order with respect to incident light to function as a master lens. The image-forming lens is divided into an intrinsic exchangeable front part and a fixed rear part so that when the front part is substituted by an attachment lens. The range of variation of the equivalent focal length of the master lens can be shifted toward longer focal lengths without causing any change in the back focal distance as it is so required because of the fixed rear part of the image-forming lens with the constant back of photographic lens. The attachment lens is constructed from at least two lens groups axially spaced from each other, each of which is provided with a rearwardly concave negative meniscus-shaped air space to prevent the reduction of high grade imagery of the master lens which would be otherwise resulted by the above-identified substitution.

8 Claims, 33 Drawing Figures

| −0.2 0 0.2 | −0.2 0 0.2 | −5 0 5 |
| SPHERICAL ABERRATION | ASTIGMATISM | DISTORTION |

FIG.7D — Y'max

FIG.7E — Y'=0.7Y'max

FIG.7F — Y'=0.5Y'max

FIG.7G — Y'=0

LATERAL ABERRATION

FIG.8A  FIG.8B  FIG.8C

-0.2  0  0.2
SPHERICAL
ABERRATION

-0.2  0  0.2
ASTIGMATISM

-5  0  5
DISTORTION

FIG.8D

Y'max

FIG.8E

Y'=0.7Y'max

FIG.8F

Y'=0.5Y'max

LATERAL ABERRATION

FIG.9A  FIG.9B  FIG.9C

SPHERICAL ABERRATION     ASTIGMATISM     DISTORTION

FIG.9D

Y'max

FIG.9E

Y'=0.7Y'max

FIG.9F

Y'=0.5Y'max

LATERAL ABERRATION

LENS SYSTEM HAVING SELECTIVELY SHIFTABLE FOCAL LENGTH

BACKGROUND OF THE INVENTION

This invention relates to optical objective lens systems having selectively shiftable equivalent focal lengths, and more particularly to an optical objective of the zoom type adapted for use with a plurality of attachment lenses of different magnification and comprising a zoom control front assembly and a rear stationary rear assembly which includes an intrinsic exchangeable front part arranged upon substitution of one of the attachment lenses to shift the range of variation of magnification of the master lens toward longer equivalent focal lengths.

U.S patent application Ser. No. 604,484, now U.S. Pat. No. 4,015,895, assigned to the same assignee as this application, discloses a zoom lens adapted for use with an afocal attachment lens to be inserted between the front and rear parts of the image-forming lens. The present invention relates to an improvement of the lens system of the application Ser. No. 604,484 to achieve a significant shortening in the size of the image-forming lens along the optical axis thereof.

SUMMARY OF THE INVENTION

The present invention has as a general object to provide a method either of selectively changing the equivalent focal length of a fixed focus objective lens system, or of selectively shifting the range of variation of the equivalent focal length of a variable focus objective lens system toward longer focal lengths, by use of a plurality of focal attachment lenses each comprising at least two lens groups axially spaced from each other, while still retaining the back focal distance constant.

Application of this method to commonly-available objective lens systems by substituting an attachment lens either for the relay lens of a zoom objective in part or in whole, or for part of a fixed focus objective, is apt to give rise to a problem such that the intrinsic exchangeable part of the master lens is far shorter in the size along the optical axis than the attachment lens which is designed to compensate for curvature of image field by minimizing the Petzval sum. According to the prior art, this problem has been overcome by previously increasing the space which is occupied by the exchangeable part of the master lens with a corresponding increase in the diameter of lens members following this exchangeable part, while permitting reduction to some extent of the high grade imaging performance of the master lens itself. In zoom lenses for use with television cameras, however, such an increase in the rear lens diameter will result in the lack of a uniform distribution of light energy between the central and marginal portions of an image as the filter located behind the zoom lens limits the diameter of an image-forming light bundle coming from the zoom lens.

An object of the present invention is to provide a master objective lens provided with a space which is to be formed when the exchangeable part is taken off and which is large enough to accommodate an attachment lens of good picture quality, while nevertheless preventing any increase in the diameter of a rear image-forming lens assembly including the exchangeable part.

To achieve this, in the case of a master objective lens including a rear lens assembly which is located in rear of a diaphragm and includes an intrinsic exchangeable part arranged upon substitution by an attachment lens to increase the magnification power of the master lens, the present invention contemplates the use of a glass block or thick lens having an axial thickness in a range between 1 and 5 times the equivalent focal length of the master objective lens itself, in the case of the zoom type lens, at the wide angle setting as incorporated in the intrinsic exchangeable front part of the rear lens assembly.

Another object of the present invention is to provide a lens system in which the magnification power of a master objective lens of the character described can be increased by substituting a lens component for the intrinsic exchangeable part of the master objective lens, with the resulting objective lens having as high an imaging performance as that of the master objective lens itself.

To achieve this, according to the present invention, the interchangeable focal length-shifting lens component (hereinafter abbreviated as "extending lens") equivalent to the aforementioned attachment lens comprising at least two lens groups axially spaced from each other is provided with a rearwardly concave meniscus-shaped air space of negative shape located within an axial distance equal to the equivalent focal length, f, of, in the case of the zoom type, to the equivalent minimum focal length, f, of, a lens system resulted from the master objective lens by substituting the extending lens for the intrinsic exchangeable part of the master objective lens, in an embodiment of the present invention to be described later, for the intrinsic exchangeable front part of a relay lens of a zoom objective, as measured forwardly from the rear vertex of the extending lens.

The provision of such an air lens causes introduction of additional aberrations. As a method of compensating for such additional aberrations, the present invention employs an additional meniscus air lens which is concave toward the image or object side when the extending lens comprises axially spaced two lens groups, of which the front one is divergent or convergent respectively, and which is located within an axial distance equal to the equivalent focal length, f, as measured rearwardly from the front vertex of the extending lens.

As a result, in order for a lens system of the present invention to preserve high grade imaging performance regardless of shifting the equivalent focal length toward larger magnifications by use of an extending lens, each of the two lens groups of the extending lens is provided with a meniscus air lens.

DESCRIPTION OF THE PREFERRED EMBODIMENTS

Figure 1:
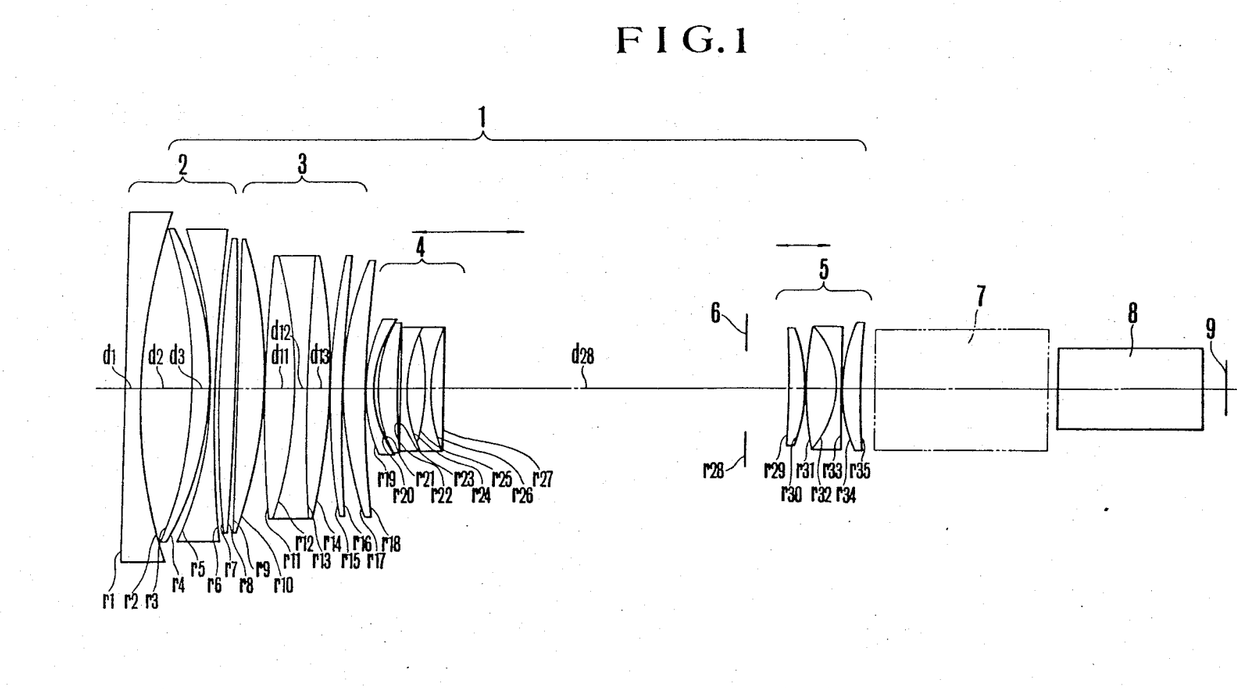
FIG. 1 is a block diagram partly schematic of an embodiment of a zoom objective lens serving as a master objective lens according to the present invention, a relay lens of the zoom objective lens being schematically shown.
Figure 2:
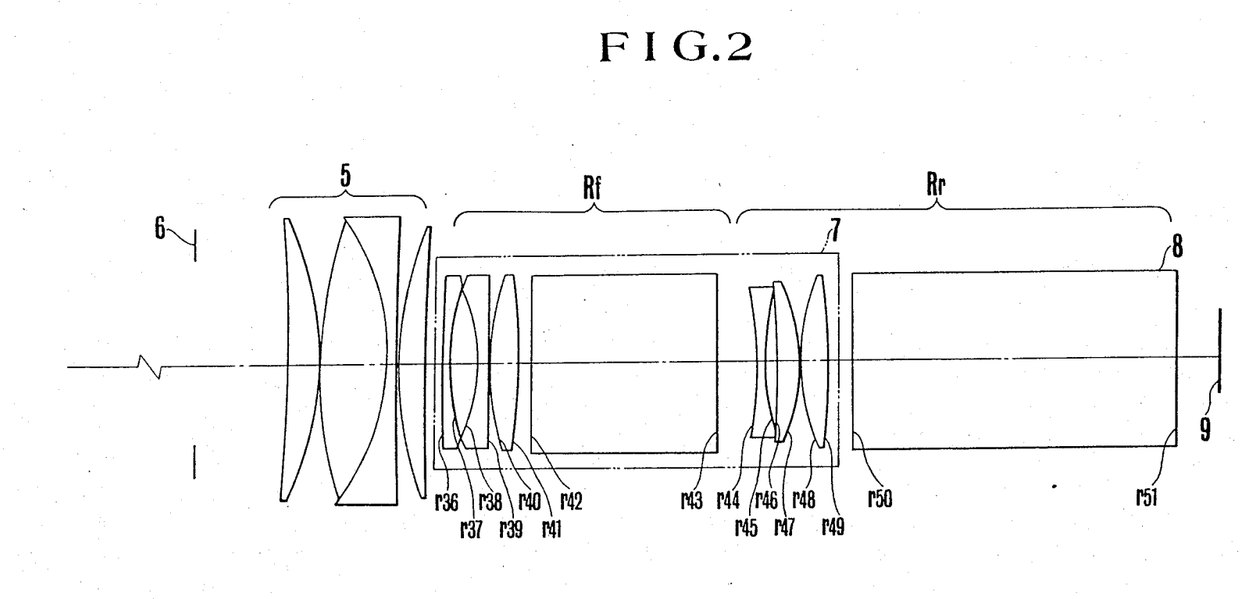
FIG. 2 is a block diagram showing the details of the rear lens assembly of the zoom objective of FIG. 1.
Figure 3:
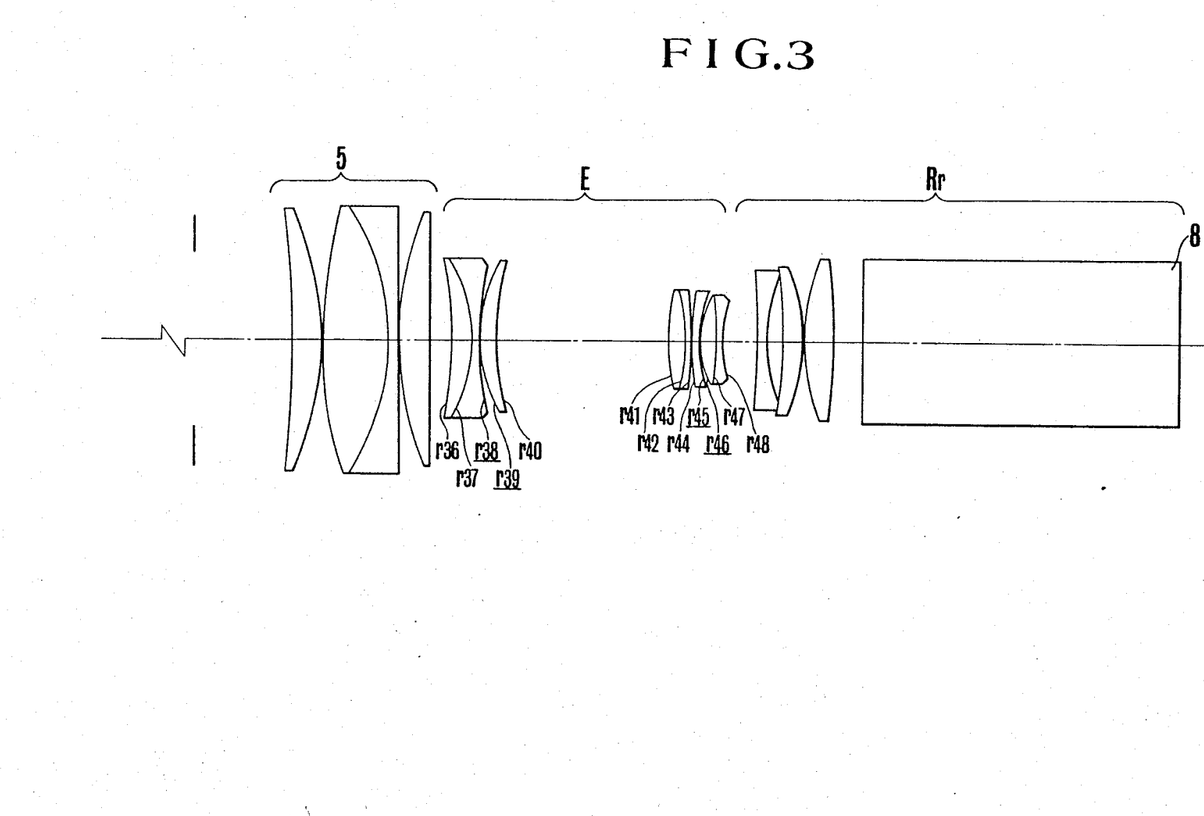
FIG. 3 is a fragmentary block diagram of a zoom objective resulted by substituting an extending lens of the invention for the intrinsic exchangeable front part of the relay lens of FIG. 2.

Referring to FIGS. 1, 2 and 3, there is shown one embodiment of the present invention as comprising a zoom objective adapted for use with an extending lens, whereby the zoom objective serves as a master lens and the extending lens serves to shift the range of variation of the equivalent focal length the master lens toward longer equivalent focal lengths. As shown in FIG. 1, the zoom objective comprises a stationary rear lens assembly 7, 8 and a front lens assembly 1 which comprises a front lens member stationary during zooming, the front member being divided into two parts 2 and 3 of which only the front part 2 is axially movable for focusing, and a plurality of zoom control members, in this instance, a variator 4 and a compensator 5. A diaphragm 6 is placed between variator 4 and compensator 5. A reference numeral 8 denotes optical means equivalent to a light-splitting system of color separation design for a color television camera. An image of a distant object is focused at a plane 9.

As shown in FIG. 2, the rear lens assembly 7, 8 or relay lens of the master zoom objective is divided into an intrinsic exchangeable front part Rf and a fixed rear part Rr. The front part Rf includes an optical glass block as positioned in a space between front and rear lens group members enclosed by dash lines 7 of the relay lens, the rear member being included in the fixed rear part Rr, to secure a room of an axial length large enough to accommodate the extending lens E of FIG. 3, after the front part Rf is taken off from the relay lens, without causing undue increase in the diameter of the relay lens of the master zoom objective itself as well as that of the extending lens E, as can be seen from the numerical data in Tables 1 and 2, in accordance with which the lens system comprising the master zoom objective of FIGS. 1 and 2 and the extending lens of FIG. 3 may be constructed. If the glass block defined parallel flat surfaces r42 and r43 and having an axial thickness of 40.00 mm is omitted with a resulting shortening of the relay lens by an axial length of 13.62 mm, it has been found, in accordance with the present invention, that the magnification power of the extending lens E must be limited to a level not higher than 1.4 times provided that the absolute value of Petzval sum of the zoom objective having the extending lens E substituted for the front part Rf is smaller than 0.2 as the master zoom objective has the Petzval sum of a value −0.0381 resulting from the prerequisite that the overall dimensions of the relay lens of the master zoom objective should be limited to a minimum. According to the present invention, however, it is proven that the range of variation of the equivalent focal length of the master zoom objective can be shifted toward longer focal lengths by 1.72 times by substituting the extending lens of FIG. 3 for the front part Rf of the master relay lens with the resulting zoom objective having the Petzval sum of a value −0.0959 smaller in absolute value than −0.0381×(1.72)² = −0.112, and therefore having field curvature superior to that of the master zoom objective, as understandable from the first and second columns of Table 5 for 3rd-order aberration coefficients. It is to be noted that the axial thickness of the glass block with the parallel flat surfaces r42 and r43 is 2.44 times as large as the minimum equivalent focal length of the master zoom objective. If a glass block having a thickness smaller than 1 times the minimum equivalent focal length of the master zoom objective is employed, it has almost no contribution to the system. When larger than 5 times, the diameter of the relay lens must be increased too much, or otherwise a uniform distribution of light energy between the central and marginal portions of the image would not be resulted particularly when the zoom objective is used with a color television camera.

Figure 5:
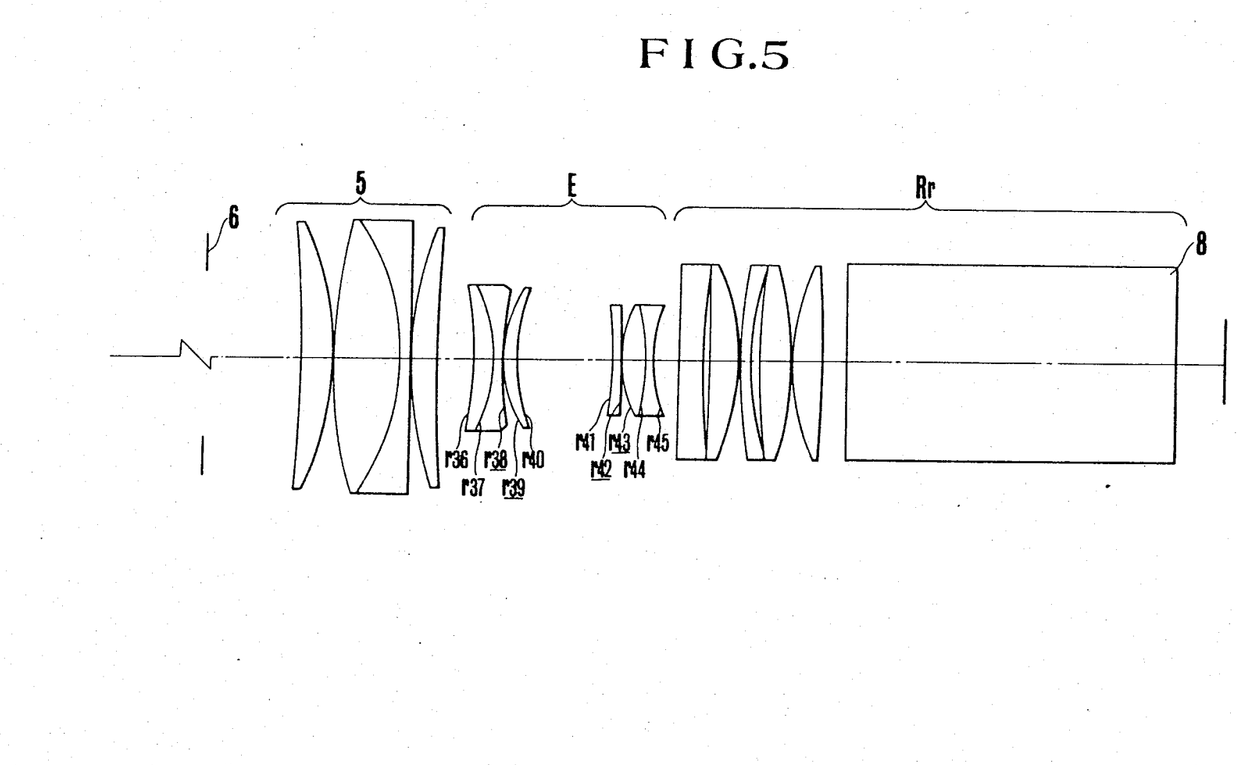
FIG. 5 is a fragmentary block diagram of a zoom objective resulted by substituting an extending lens of the invention for the front part of the relay lens of FIG. 4.
Figure 6A:
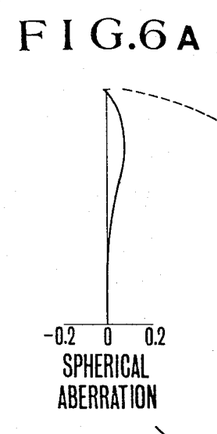
FIGS. 6A to 6G are graphs showing the state of correction of spherical aberration, astigmatism, distortion and lateral aberrations at 1.0, 0.7, 0.5 and zero Y' max's attained for the master zoom objective of FIGS. 1 and 2 at the wide angle setting respectively.
Figure 6B:
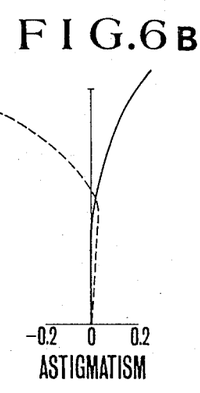
Figure 6C:
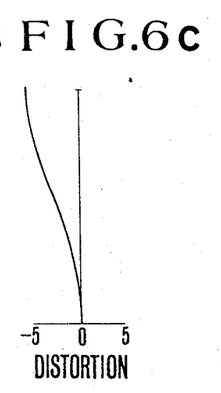
Figure 6D:
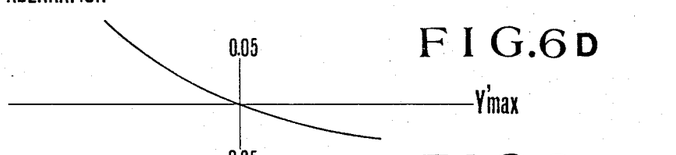
Figure 6E:
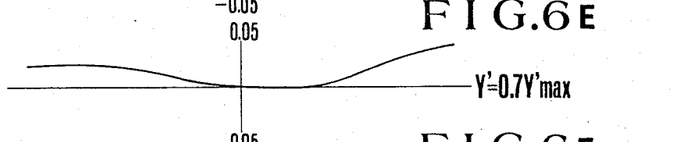
Figure 6F:
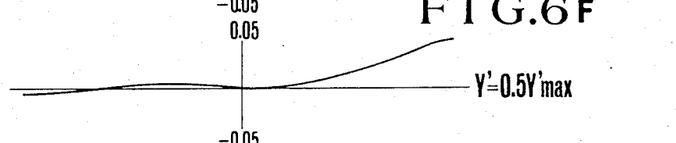
Figure 6G:
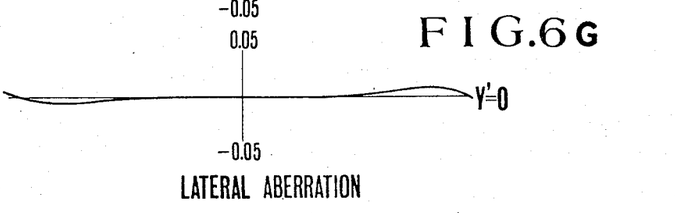
Figure 7A:
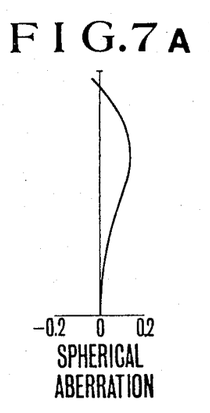
FIGS. 7A to 7G are similar graphs for the extended zoom objective of FIGS. 1 and 3.
Figure 7B:
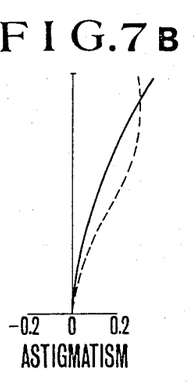
Figure 7C:
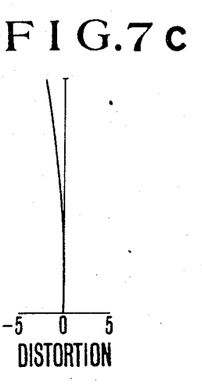
Figure 7D:
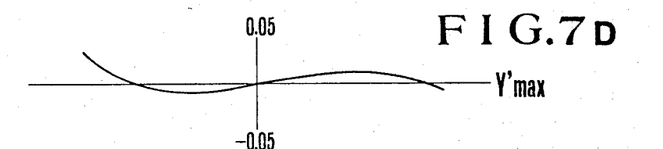
Figure 7E:
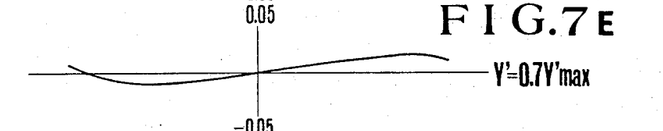
Figure 7F:
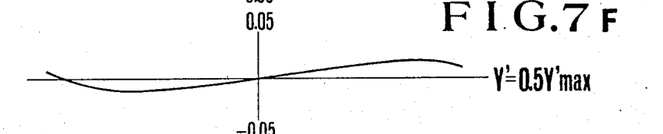
Figure 7G:
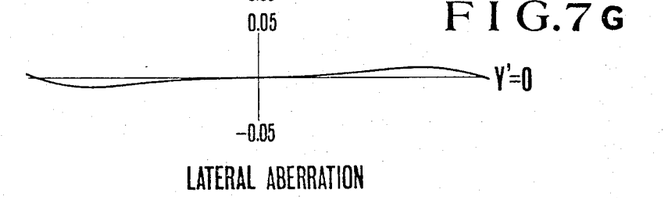
Figure 8A:
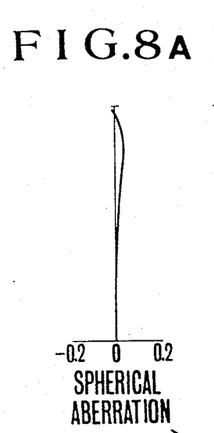
FIGS. 8A to 8G are similar graphs for the master zoom objective of FIGS. 1 and 4.
Figure 8B:
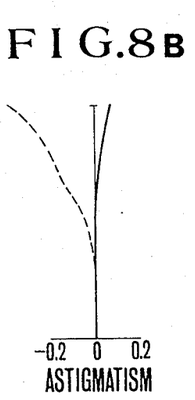
Figure 8C:
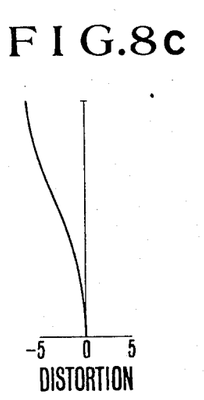
Figure 8D:
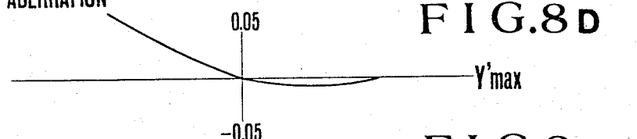
Figure 8E:
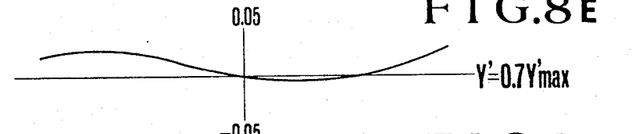
Figure 8F:
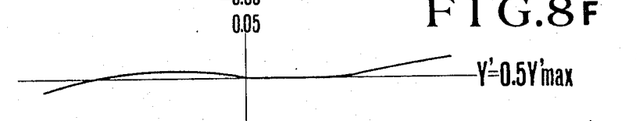
Figure 8G:
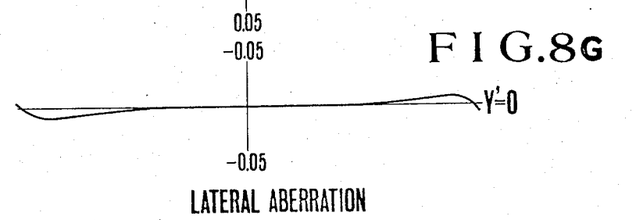
Figure 9A:
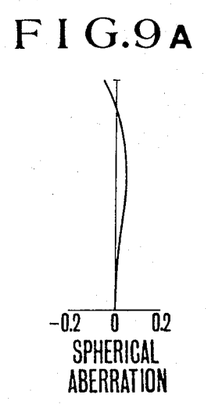
FIGS. 9A to 9G are similar graphs for the extended zoom objective of FIGS. 1 and 5.
Figure 9B:
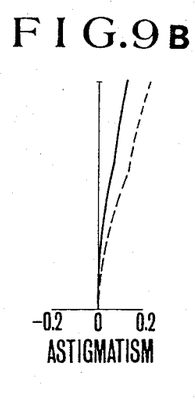
Figure 9C:
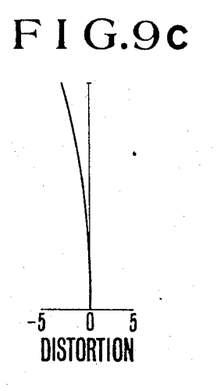
Figure 9D:
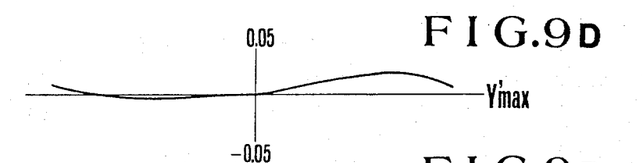
Figure 9E:
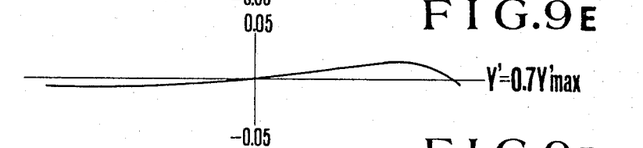
Figure 9F:
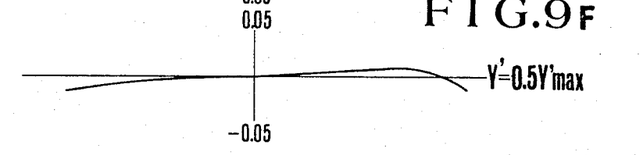
Figure 9G:
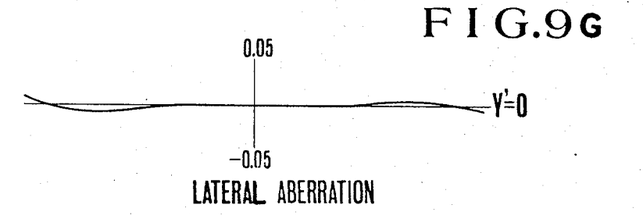

FIG. 3 shows an example of the extending lens E constructed in accordance with the present invention as comprising front and rear lens members which may be either of intimate thin lens design, or of thick lens design equivalent thereto in order to ensure that the substituting operation between the intrinsic exchangeable front part Rf of the master relay lens and the extending lens E can be carried out to shift the range of variation of the equivalent focal length of the lens system without recourse to adjustment of the back focal length. This requirement calls for employment of a lens member having a very large negative refractive power as the rear member of the extending lens E. The sign of the refractive power of the front member of the extending lens E depends upon the optical condition of the front lens assembly 1 of the master zoom objective, and it is minus in the case of the front assembly 1 of FIG. 1. This rear lens member seriously affects aberrations characteristic of the divergent lens and particularly ascribable to the oblique pencils of rays which are transmitted therethrough to extra-axial image points. In order to compensate for residual aberrations of this nature, it is necessary to introduce a rearwardly concave meniscus-shaped air space or air lens into the rear lens member of the extending lens E at a location within an axial distance equal to the minimum equivalent focal length of the extended zoom objective as measured forwardly from the rear vertex of the rear lens member, that is, of the extending lens E. The introduction of this air lens as defined, in this instance, by surfaces r45 and r46, and in FIG. 5 instance, by surfaces r42 and r43, in turn calls for production of additional coma. This coma may be compensated by use of an additional meniscus air lens, in FIGS. 3 and 5 instances, of rearward concavity as introduced into the front lens member of the extending lens E at a location within an axial distance equal to the minimum equivalent focal length of the extended zoom objective as measured rearwardly from the front vertex of the front member, that is, of the extending lens E. In FIGS. 3 and 5, this second air lens is defined by surfaces r38 and r39. In the case of the convergent front lens member of the extending lens E, the second air lens should be of forward concavity.

Figure 4:
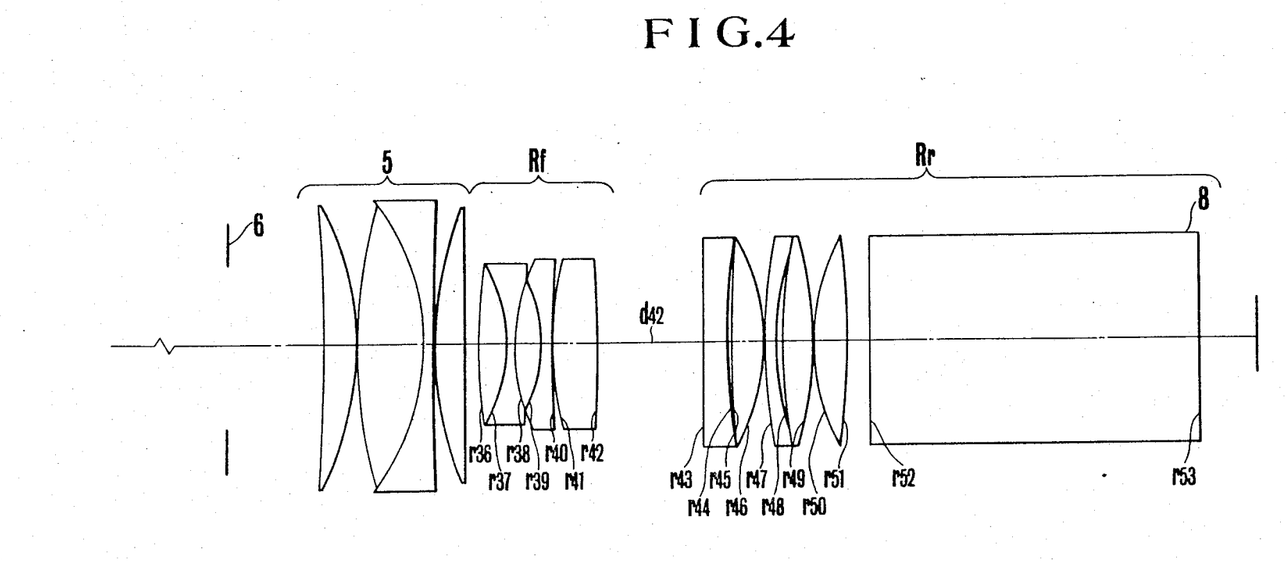
FIG. 4 is a fragmentary block diagram of another embodiment of a zoom objective according to the present invention, the front lens assembly of the zoom objective being identical to that of FIG. 1.

According to another preferred embodiment of the lens system of the invention, a relay lens which may operate with the front lens assembly 1 of FIG. 1, and an extending lens are shown in FIGS. 4 and 5 and can be constructed as represented by the numerical values in Tables 3 and 4 respectively. This embodiment has employed thickened lens elements for the front and rear relay lens members instead of using a glass block. In Tables 1 to 5 and in the accompanying drawings, the radii of curvature, r, and the axial separations between successive surfaces, d, are expressed with the subscripts numbered consecutively from front to rear. The plus and minus values of the radii, r, indicate surfaces convex and concave toward incident light respectively. The refractive indices of the various lens elements and the respective Abbe numbers are indicated by nd and vd respectively. Various 3rd-order aberration coefficients for spherical aberration I, coma II, astigmatism III, Petzval sum P and distortion V of the first and second examples of the lens system of the invention at the wide angle region are shown in Table 5, with column 1 for the master zoom objective of Table 1, column 2 for the extended zoom objective of Tables 1 and 2, column 3 for the master zoom objective of Tables 1 and 3, column 4 for the extended zoom objective of Tables 1, 3 and 4.

It will be seen from the foregoing description that the present invention provides a lens system comprising a master zoom objective adapted for use with an extending lens capable, upon association with the master zoom objective, of shifting the range of variation of the equivalent focal length of the master zoom objective toward longer focal lengths while nevertheless preserving good state of correction of various aberrations which has heretofore been impossible with a lens system of the type described which is, though having a large zoom ratio with a large relative aperture and with an extremely large included angle of view, shortened in the size along the optical axis in relation to the minimum equivalent focal length as compared with the conventional lens system of the same type.

TABLE 1

Master Zoom Objective Focused at Infinity
Focal length f = 16.37–277.45

| | No. | r | d | nd | vd |
|---|---|---|---|---|---|
| Front focusing member $f_1 = -187.8786$ | 1 | −4453.80 | 5.0 | 1.0 | |
| | 2 | 230.46 | 28.98 | 1.71300 | V3.9 |
| | 3 | −160.73 | 7.5 | 1.0 | |
| | 4 | −139.33 | 0.3 | 1.80518 | 25.4 |
| | 5 | −155.27 | 4.5 | 1.0 | |
| | 6 | 1024.07 | 0.15 | 1.64000 | 60.2 |
| | 7 | 667.00 | 8.0 | 1.0 | |
| | 8 | −1086.00 | Variable | 1.80518 | 25.4 |
| Rear focusing member $f_2 = 114.80172$ | 9 | −845.47 | 11.9 | 1.0 | |
| | 10 | −160.22 | 0.15 | 1.60311 | 60.7 |
| | 11 | 796.87 | 15.40 | 1.0 | |
| | 12 | −167.83 | 4.0 | 1.60311 | 60.7 |
| | 13 | 705.47 | 9.3 | 1.80518 | 25.4 |
| | 14 | −379.50 | 0.15 | 1.62041 | 60.3 |
| | 15 | 267.73 | 8.2 | 1.0 | |
| | 16 | 2870.19 | 0.15 | 1.62041 | 60.3 |
| | 17 | 137.94 | 10.6 | 1.0 | |
| | 18 | 384.93 | Variable | 1.62041 | 6.3 |
| Variator $f_3 = -37.00909$ | 19 | 93.501 | 2.0 | 1.73400 | 51.5 |
| | 20 | 60.966 | 2.33 | 1.0 | |
| | 21 | 94.093 | 5.6 | 1.80518 | 25.4 |
| | 22 | 164.25 | 1.31 | 1.0 | |
| | 23 | 518.514 | 1.7 | 1.83481 | 42.8 |
| | 24 | 48.14 | 9.83 | 1.0 | |
| | 25 | −58.591 | 1.7 | 1.73400 | 51.5 |
| | 26 | 70.315 | 5.0 | 1.92286 | 21.3 |
| | 27 | ∞ | 1.0 | | |
| | 28 | ∞ | Variable | | |
| Compensator | 29 | −366.34 | 6.5 | 1.60311 | 60.7 |

TABLE 1-continued

| | No. | r | d | nd | vd |
|---|---|---|---|---|---|
| $f_4 = 54.1931$ | 30 | −72.30 | 0.15 | 1.0 | |
| | 31 | 116.52 | 14.20 | 1.73400 | 51.5 |
| | 32 | −53.148 | 2.0 | 1.74077 | 27.8 |
| | 33 | 1858.45 | 0.15 | 1.0 | |
| | 34 | 80.298 | 6.0 | 1.60311 | 60.7 |
| | 35 | 618.65 | variable | | |
| Front relay lens member $f_5 = -80.30$ | 36 | −358.94 | 1.5 | 1.0 | |
| | 37 | 54.806 | | 1.73400 | 51.5 |
| | 38 | −37.5 | 6.53 | 1.0 | |
| | 39 | −999.34 | 2.0 | 1.73400 | 51.5 |
| | 40 | 70.315 | 0.15 | 1.0 | |
| | 41 | −169.95 | 6.0 | 1.80518 | 25.4 |
| | 42 | ∞ | 3.0 | 1.0 | |
| | 43 | ∞ | 40.0 | 1.51633 | 70.1 |
| Rear relay lens member $f_6 = 76.52$ | 44 | −226.03 | 8.0 | 1.80518 | 25.4 |
| | 45 | 55.486 | 2.0 | 1.0 | |
| | 46 | −181.56 | 2.87 | 1.61800 | 63.4 |
| | 47 | −44.332 | 4.5 | 1.0 | |
| | 48 | 47.16 | 0.15 | 1.61800 | 63.4 |
| | 49 | −145.86 | 6.0 | 1.0 | |
| | 50 | ∞ | 5.0 | 1.51633 | 64.1 |
| | 51 | ∞ | 70.0 | 1.0 | |

Back Focal Length: 8.96  Σd = 503.94

Lens Separation during Zooming with object at Infinity

| f | d8 | d18 | d28 | d35 |
|---|---|---|---|---|
| 16.37 | 1.51842 | 145.81769 | 20.61537 | 3.5 |
| 67.46 | 80.49722 | 55.54164 | 16.41332 | 19.00 |
| 277.45 | 117.71842 | 2.37893 | 3.41683 | 47.94 |

TABLE 2

Extending lens for use with Objective of Table 1 to Provide Shifted f = 28.13–477.2
Magnification power: × 1.72

| | No. | r | d | nd | vd |
|---|---|---|---|---|---|
| Front member $fa = -103.92$ | 36 | −133.22 | | 1.0 | |
| | 37 | −36.969 | 4.5 | 1.80518 | 25.4 |
| | 38 | 94.956 | 1.5 | 1.80610 | 40.9 |
| | 39 | 36.71 | 0.15 | 1.0 | 70.1 |
| | 40 | 58.975 | 3.0 | 1.48749 | |
| | | | 37.71195 | | |
| Front member $fb = -76.95$ | 41 | 84.227 | 3.2 | 1.0 | |
| | 42 | −62.704 | 1.4 | 1.59270 | 35.3 |
| | 43 | −128.76 | 0.15 | 1.80610 | 40.9 |
| | 44 | 185.31 | 1.3 | 1.0 | |
| | 45 | 30.956 | 0.15 | 1.79952 | 42.2 |
| | 46 | 23.926 | 3.5 | 1.0 | |
| | 47 | 156.19 | 1.3 | 1.59270 | 35.3 |
| | 48 | 30.427 | 7.42197 | 1.80610 | 40.9 |

Lens Separation during Zooming with Object at Infinity

| Shifte F | d35 |
|---|---|
| 28.13 | 4.858 |
| 116.03 | 20.358 |
| 477.2 | 49.296 |

TABLE 3

Relay Lens for use with Front Assembly of Objective of Table 1 to Provide f = 12.31–208.74

| | No. | r | d | nd | vd |
|---|---|---|---|---|---|
| Front relay lens member $f_5 = -32.40248$ | 36 | 135.96 | 6.5 | 1.0 | |
| | 37 | −34.731 | 1.5 | 1.80518 | 25.4 |
| | 38 | 46.419 | 5.97 | 1.80610 | 40.9 |
| | 39 | −28.234 | 1.5 | 1.0 | |
| | 40 | 208.11 | 0.2 | 1.80610 | 40.9 |
| | 41 | 70.315 | 10.0 | 1.0 | |
| | 42 | −637.52 | 22.5 | 1.80518 | 25.4 |
| | | | | 1.0 | |
| Rear relay lens | 43 | ∞ | 5.0 | 1.84666 | 23.9 |

TABLE 3-continued

| member | No. | r | d | nd | vd |
|---|---|---|---|---|---|
| $f_6 = 46.46199$ | 44 | 143.60 | 1.15 | 1.0 | |
| | 45 | 627.618 | 6.9 | 1.48749 | 70.1 |
| | 46 | −45.755 | 0.15 | 1.0 | |
| | 47 | 142.85 | 2.0 | 1.84666 | 23.9 |
| | 48 | 70.691 | 1.75 | 1.0 | |
| | 49 | 155.27 | 6.7 | 1.48749 | 70.1 |
| | 50 | −74.179 | 0.15 | 1.00 | |
| | 51 | 49.716 | 6.8 | 1.48749 | 70.1 |
| | 52 | −210.38 | 5.0 | 1.0 | |
| | 53 | ∞ | 70.0 | 1.51633 | 64.1 |
| | 54 | ∞ | | 1.0 | |

Back focal length: 13.09  $\Sigma d = 500.15$

Lens Separation during Zooming with Object at Infinity

| f | d35 |
|---|---|
| 12.31 | 3.6 |
| 50.75 | 19.0993 |
| 208.74 | 48.0374 |

TABLE 4

Extending Lens for use with Objective of
Tables 1 and 3 to Provide Shifted f = 21.00–355.9
Magnification power: × 1.705

| | No. | r | d | nd | vd |
|---|---|---|---|---|---|
| Front member | 36 | −102.90 | 4.5 | 1.0 | |
| fa = | 37 | −33.773 | 1.5 | 1.80518 | 25.4 |
| −96.57444 | 38 | 72.975 | 0.15 | 1.80610 | 40.9 |
| | 39 | 26.744 | 3.2 | 1.0 | 35.3 |
| | 40 | 43.342 | 21.00587 | | |
| | | | | 1.59270 | |
| Rear member | 41 | −77.73 | 1.4 | 1.0 | |
| fb = | 42 | 326.94 | 0.15 | 1.78590 | 44.1 |
| −46.61462 | 43 | 30.58 | 5.5 | 1.0 | |
| | 44 | −45.716 | 1.4 | 1.59270 | 35.3 |
| | 45 | 32.719 | 5.52726 | | |
| | | | | 1.79952 | 42.4 |

Lens Separation during Zooming with Object at Infinity

| Shifted f | d35 |
|---|---|
| 21.00 | 7.4393 |
| 86.54 | 22.9386 |
| 355.9 | 51.8767 |

TABLE 5

Aberration Coefficient of Zoom Objective with
Following Member at Wide Angle Setting

| | 1 | 2 | 3 | 4 |
|---|---|---|---|---|
| I | −0.2322 | −1.7111 | 0.0522 | −0.6891 |
| II | −0.1113 | −0.1835 | −0.0242 | −0.1172 |
| III | −0.0394 | −0.1204 | 0.0065 | −0.0989 |
| P | −0.0381 | −0.0959 | −0.0302 | −0.070 |
| V | −0.4477 | 0.2651 | 0.4970 | 0.4031 |

What is claimed is:

1. A zoom lens system having an enlarged range of variation in magnification, comprising a primary lens part consisting of a focusing front lens group and a negative variator group and a positive variator group arranged in the order recited relative to incident light from an objective, a basic lens group positioned in rear of said primary lens part, said basic lens group consisting of an exchangeable front sub-group having a negative refracting power and a fixed rear sub-group, and a focal attachment lens which is to be positioned between said primary lens part and said rear sub-group in axial alignment with each other after said front sub-group is taken off, said attachment lens comprising two lens groups axially spaced apart from each other, said attachment lens being constructed such that when said attachment lens is positioned between said primary lens part and said rear sub-group, the back focal length of said zoom lens system is the same as before said front sub-group is taken off.

2. A zoom lens system as described in claim 1, wherein said attachment lens comprises a front lens group, and a rear lens group, said front lens group including a meniscus-shaped air lens having a radius of its convex surface larger than a radius of its concave surface.

3. A zoom lens system as in claim 2, wherein said attachment lens is provided with a rearwardly concave meniscus-shaped air lens located at the rear lens group thereof.

4. A zoom lens system having an enlarged range of variation in magnification, comprising a primary lens part, a basic lens group positioned in rear of said primary lens part, said basic lens group consisting of an exchangeable front sub-group and a fixed rear sub-group, and an attachement lens which is to be positioned between said primary lens part and said rear sub-group in axial alignment with each other after said front sub-group is taken off, said attachment lens comprising at least two lens groups axially spaced apart from each other, said primary lens part including a focusing lens group and a plurality of lens groups movable for zooming arranged in this order with respect to incident light, and said front sub-group of said basic lens group includes a glass plate member having parallel flat surfaces perpendicular to the optical axis of the basis lens group.

5. A zoom lens system having an enlarged range of variation in magnification, comprising a primary lens part, a basic lens group positioned in rear of said primary lens part, said basic lens group consisting of an exchangeable front sub-group and a fixed rear sub-group, and an attachment lens which is to be positioned between said primary lens part and said rear sub-group in axial alignment with each other after said front sub-group is taken off, said attachment lens comprising at least two lens groups axially spaced apart from each other, said primary lens part including a focusing lens group and a plurality of lens groups movable for zooming arranged in this order with respect to incident light, and said front sub-group of said basic lens group includes a glass block having an axial thickness in a range between 1 and 5 times the minimum equivalent focal length of the entire lens system.

6. A zoom lens system having an enlarged range of variation in magnification, comprising a primary lens part consisting of a focusing front lens group and a negative variator group and a positive variator group arranged in the order recited relative to incident light from an objective, a basic lens group positioned to the rear of said primary lens part, said basic lens group consisting of an exchangeable front sub-group having a negative refractive power and a fixed rear sub-group, and an attachment lens which is to be positioned between said primary lens part and said rear sub-group in axial alignment with each other after said front sub-group is taken off, said attachment lens comprising two lens groups axially spaced apart from each other, said attachment lens being provided with a meniscus-shaped air lens located in the front lens group thereof, said meniscus-shaped air lens having a concave face facing the image end, said attachment lens being constructed such that when said attachment lens is positioned between said primary lens part and said rear sub-group, the back focal length of said zoom lens system is the same as before said front sub-group is taken off.

7. A zoom lens system having an enlarged range of variation in magnification, comprising a primary lens part, a basic lens group positioned in rear of said primary lens part, said basic lens group consisting of an exchangeable front sub-group and a fixed rear sub-group, and an attachment lens which is to be positioned between said primary lens part and said rear sub-group in axial alignment with each other after said front sub-group is taken off, said attachment lens comprising at least two lens groups axially spaced apart from each other, said attachment lens being provided with a meniscus-shaped air lens located in the front lens group thereof, said primary lens part including a focusing lens group and a plurality of lens groups movable for zooming arranged in this order with respect to incident light, and said front sub-group of said basic lens group includes a glass plate member having parallel flat surfaces perpendicular to the optic axis of the basic lens group.

8. A zoom lens system as described in claim 7, wherein said attachment lens is provided with a second rearwardly concave meniscus-shaped air lens of negative refractivity located at the rear lens group thereof.

* * * * *